Sept. 1, 1964
F. V. BOOKOUT
3,146,907
DISPENSING DEVICE
Filed Feb. 20, 1961
4 Sheets-Sheet 1
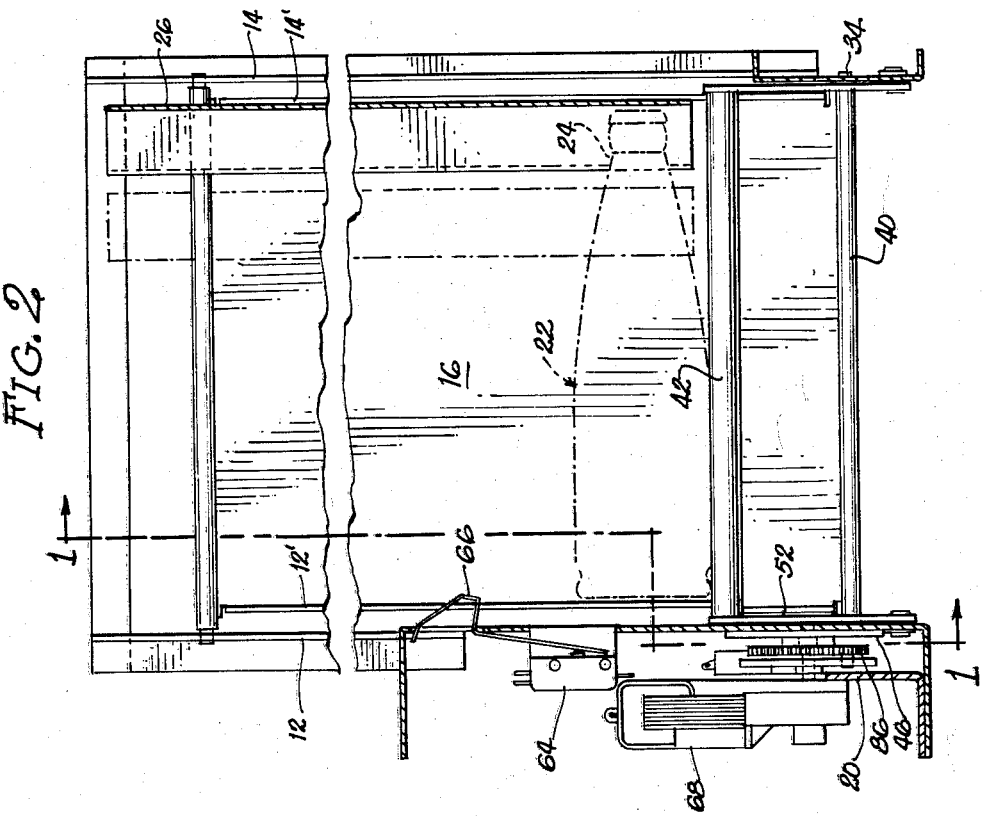
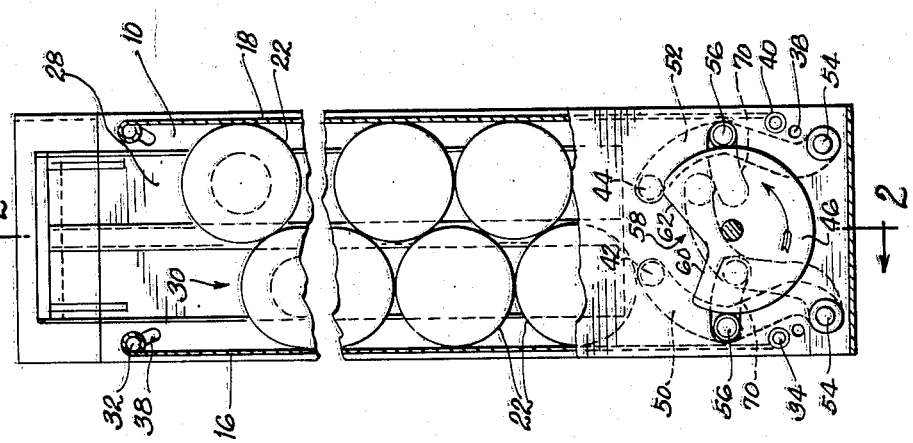
INVENTOR.
Floyd V. Bookout
BY
Ooms, McDougall, Williams & Hersh
Att'ys Sept. 1, 1964     F. V. BOOKOUT     3,146,907
DISPENSING DEVICE
Filed Feb. 20, 1961     4 Sheets-Sheet 3
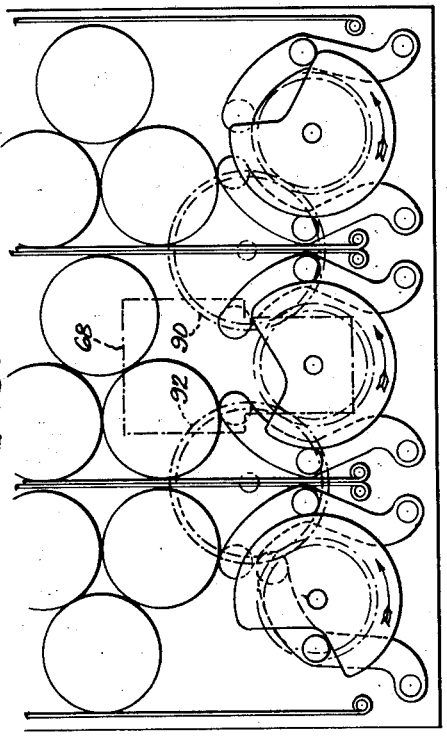
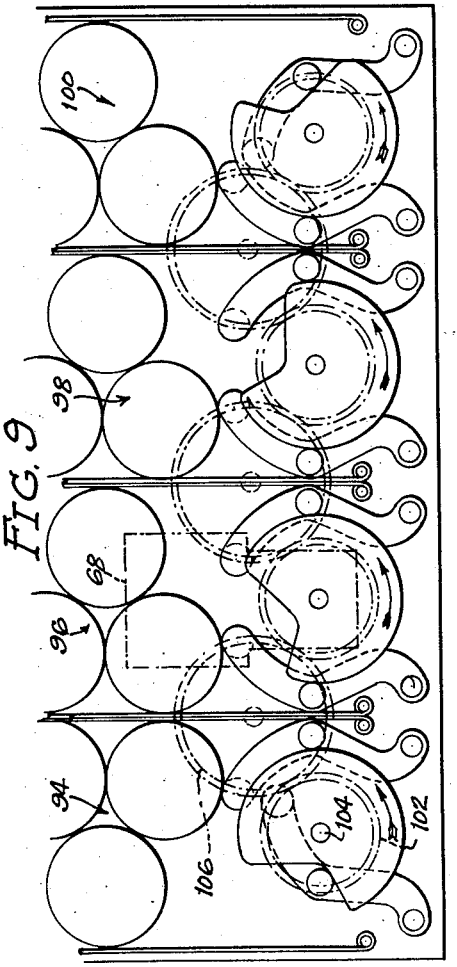
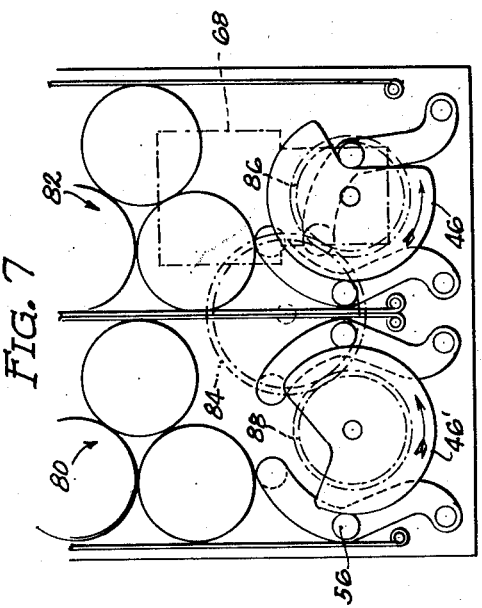
INVENTOR.
Floyd V. Bookout Sept. 1, 1964     F. V. BOOKOUT     3,146,907
DISPENSING DEVICE
Filed Feb. 20, 1961     4 Sheets-Sheet 4
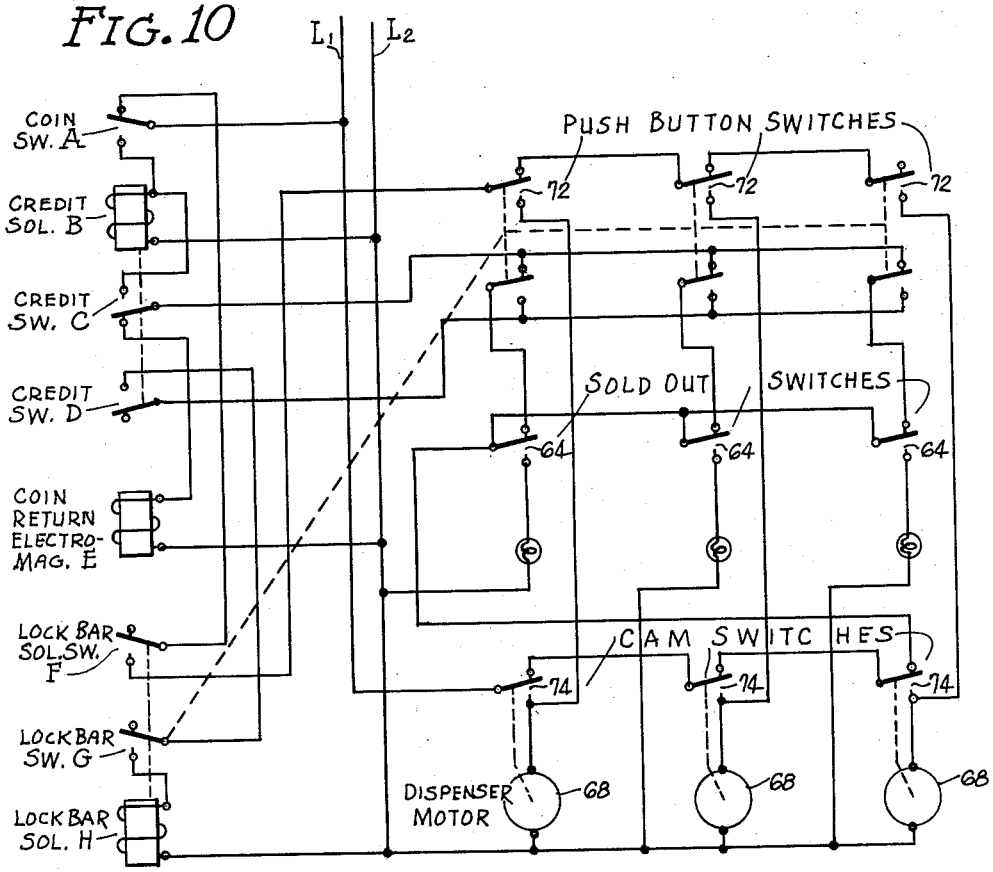
INVENTOR.
Floyd V. Bookout United States Patent Office 3,146,907
Patented Sept. 1, 1964

3,146,907
DISPENSING DEVICE
Floyd V. Bookout, Rockford, Ill., assignor, by mesne assignments, to L. W. Menzimer, trustee, Rockford, Ill.
Filed Feb. 20, 1961, Ser. No. 90,346
10 Claims. (Cl. 221—67)

This invention relates to the dispensing of packaged material and, more particularly, to a new and improved machine for dispensing individual units of a packaged material or article in response to a vend cycle or other impulse.

The invention will be described with reference to the dispensing of bottled beverages of one or more flavors in cylindrically shaped containers, but it will be understood that the device can be used equally well for dispensing other packaged articles, such as canned goods, bottled goods, packaged goods, and other articles or products preferably supplied in cylindrical shapes.

It is an object of this invention to produce a dispensing device which is simple in construction and easy in operation whereby the dispensing process can be effected easily and quickly.

Another object is to produce a dispensing machine which is free from interferences in normal operation whereby the articles can be delivered smoothly and cleanly, and wherein the development of such forces as would otherwise cause crushing of the articles to be dispensed or the increase in operating loads is eliminated, thereby to permit substantially continuous and trouble-free operation at minimum cost, especially when measured from the standpoint of upkeep and repair and cost of operation; and it is a related object to produce a dispensing machine of the type described which is capable of dispensing numerous articles and which is capable of numerous ramifications from the standpoint of arrangement and the delivery of articles to be dispensed.

These and other objects and advantages of this invention will hereinafter appear and for purposes of illustration, but not of limitation, embodiments of the invention are shown in the accompanying drawings, in which—

FIGURE 1 is a sectional elevational view taken along the line 1—1 of FIGURE 2 and showing the arrangement of elements in a single column in a dispensing device embodying the features of this invention;

FIGURE 2 is a sectional elevational view taken along the line 2—2 of FIGURE 1;

FIGURE 7 is a schematic sectional elevational view showing the arrangement of parts in a 2-column dispenser;

FIGURE 8 is a schematic sectional elevational view showing the arrangement of parts in a 3-column dispenser;

FIGURE 9 is a schematic sectional elevational view showing the arrangement of parts in a 4-column dispenser; and FIGURE 10 is an electrical diagram which may be used with the device as shown in FIGURES 1 and 2.

Figure 3:
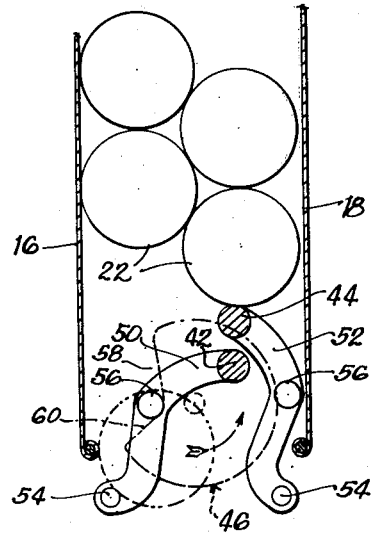
FIGURE 3 is a sectional elevational view similar to that of FIGURE 1 showing the arrangement of elements in a dispensing position.

Since the concepts of this invention reside in a new and improved dispensing mechanism independent of the cabinet in which it is located or the means for delivery of the article that is dispensed, the invention will hereinafter be described with reference to a dispensing unit, its method of operation and control.

Each dispensing unit includes a compartment 10 defined by vertically disposed front and back walls 12 and 14, and side walls 16 and 18, all of which are supported upon a suitable base frame 20. The front and back walls 12 and 14 are spaced one from the other by an amount slightly greater than the length of the bottles 22 or other articles adapted to be stacked therein for dispensing. When in the form of bottled beverages wherein the containers are of cylindrical shape having smaller neck portions 24, the portions of the compartment in which the necks are to be disposed can be provided with laterally spaced-apart, vertically disposed bracket plates 26 defining guide slots 28 in which the necks of the containers can be received as a guiding means for controlling movements of the containers as they are displaced vertically downwardly through the compartment during the dispensing operations. The bracket plates and guide slots are not essential to the operation of the dispensing mechanism but they are useful in controlling movements through the compartment of the articles to be dispensed.

The side walls 16 and 18 of each compartment are spaced one from the other by an amount greater than the maximum wall-to-wall dimension crosswise of the container but less than twice such dimension so that when the containers are laid horizontally in the compartment to extend lengthwise between the front and back walls, the containers will form into a column 30 in which the containers are staggered or alternately offset one from the other in two rows, the center lines of which are offset one from the other by an amount less than said maximum wall-to-wall dimension of the containers. It is preferred to make use of a spaced relationship between the side walls which is less than twice the maximum wall-to-wall dimension or diameter of the containers but more than one and one-half times said wall-to-wall dimension or diameter, thereby to provide for greater offset between the center lines of the staggered containers in the column.

It is desirable to embody means for adjustment of the spaced relationship between the side walls of the compartment for purposes of adapting the compartment for best use with bottles or containers of different dimensions. One such means, illustrated in FIGURE 1, comprises supporting and stiffening rods 32 and 34 rigid with the upper and lower ends of said side walls and having end portions extending beyond the side walls into engagement with suitable openings 36 and/or slots 38 in the front and back walls of the compartment. In the illustrated modification, the front and back walls are provided with spaced slots 38 in the upper end portions extending angularly downwardly and inwardly by an amount corresponding to half the lateral adjustment desired to be made available. The same front and back walls are provided with two or more openings 36 in the lower end portion vertically aligned with the slots and having their centers arranged on a line parallel with the slope of the slots. The spaced relationship of the wall panels can be adjusted merely by removal of the lower rods 34 by endwise displacement from the aligned openings and the looped end portions 40 of the wall panels to free the lower end portions of the panels for displacement into alignment with another set of openings. Such movement is permitted by the upper rods 32 in operative engagement with the slots 38 for enabling displacement therethrough. When in the adjusted position with the looped end portions of the wall panels aligned with the new set of openings, the lower rods 34 can be reinserted to secure the panels in the newly adjusted position. Thus the positions at the lower ends of the panels are stabilized, thereby also to stabilize the positions of the rods within the slots to support the wall panels in the newly adjusted position.

Having described the dimensional characteristics of a compartment for housing a column of bottles or containers in the described staggered relationship, description will now be made of the means for dispensing said containers one at a time from the compartment.

The dispensing mechanism embodies a pair of abutments 42 and 44 in the lower open-end portion of a compartment and arranged normally to extend in the path of the containers to block the passage of the containers therethrough. It includes means for effecting displacement of alternate ones of said abutments in each pair out of the path of the container to free the container for passage gravitationally downwardly beyond the abutment and through the open end of the compartment in a dispensing operation.

For this purpose, the abutments, illustrated in the form of rods extending lengthwise across the lower end of the compartment, but which may be of other construction, are spaced one from the other and from the side walls of the compartment so that one abutment 42 will lie in the path of one row of containers in the column but not in the path of the other row, while the other abutment 44 will lie in the path of the other row of containers in the column but not in the first, whereby the displacement of one abutment from the path of the containers in one row will enable the container to fall freely through the open bottom of the compartment and, similarly, for the other abutment. In the preferred practice, the abutments are adapted to be shiftable between blocking and unblocking positions with one abutment vertically aligned with about the centers of one row of the containers and the other abutment vertically aligned with about the centers of the other row of containers when in blocking position, and to be displaced laterally in the direction away from the adjacent wall for passage of the container therebetween, when in unlocking position.

The abutments are controlled in their movements between blocking and unblocking positions by means of a disc cam 46 mounted on shaft 48 for rotational movement about a horizontal axis located at about the center of the compartment. The abutments 42 and 44 are rigid with one end of curvilinear linking arms 50 and 52, respectively, which are pivoted at their opposite ends on pins 54 to the frame 20 or other support for rocking movement of the arms between blocking and unblocking positions. The intermediate portion of each arm is provided with a stud or roller 56 which operatively engages the periphery of the disc cam 46 to follow the contour thereof. The studs are constantly urged to follow the contour of the disc cam by the forces generated from the load of containers resting on the abutments and by arrangement of the abutments to be offset inwardly from the pivot, when in blocking position, thereby to generate a force vector which urges the lever arms 50 and 52 to rock inwardly about the pivots constantly to urge the studs into operative engagement with the periphery of the disc cam.

The disc cam 46 is formed with a recessed portion 58 having its leading edge 60 extending inwardly rather sharply from the periphery for a distance short of the center, and a trailing portion 62 which extends more gradually outwardly for return to the periphery. The recessed portion 58 is dimensioned to extend over an angle of less than 180° and preferably less than 170° so that both of the abutments 42 and 44 will be displaced to blocking position during at least a portion of the cycle.

The concepts of this new and novel construction can best be illustrated with reference to a cycle of operation. FIGURE 1 illustrates the arrangement of parts in normal position with both of the studs 56 riding on the periphery of the cam 46 whereby both of the abutments 42 and 44 are held in blocking position. In this position, the abutments 42 and 44 lie in the paths of the containers 22 to prevent displacement of any container downwardly for passage from the compartment. The lowermost container in the column rests on one abutment, such as the abutment to the left in FIGURE 1, whereby the entire load of the containers in the column is transmitted through the one lowermost container to the abutment on which it rests. The other abutment 44 is free of any containers and thus free of any direct load.

As the disc cam is rotated about its axis in the direction of the arrow, the cam reaches the position shown in FIGURE 3 wherein the stud 56 on the lever arm 50 enters the recessed portion 58 of the disc cam 46 to enable the arm to be rocked inwardly about this pivot in response to the load on the abutment, whereby the abutment 42 is displaced laterally inwardly and downwardly in a curvilinear path gradually to permit lowering of the column of containers in the compartment. When the abutment 42 has been displaced inwardly by an amount wherein the spaced relationship between the abutments and the adjacent side wall 16 of the compartment is greater than the maximum wall-to-wall dimension crosswise of the container, the lowermost container in the stack, originally resting on the abutment 42, will be free to pass gravitationally downwardly between the abutment 42 and the wall 16 to be dispensed from the compartment.

The other abutment 44 of the pair remains in blocking position to engage the next-to-the-lowermost container now at the other side of the column as the column is lowered upon release of the previous lowermost container, whereby said next-to-the-lowermost container now becomes the lowermost at rest on the other of the abutments in the pair, which now assumes the load of the stack of containers in the column. The now lowermost container is thus blocked from downward movement by the abutment 44 and it is confined to prevent lateral movement by the adjacent wall 18 and the next-to-the-lowermost container offset in the column, thereby to block the container against downward movement and against lateral movement. In this manner, the column of containers in the compartment is blocked against displacement from the column.

Figure 4:
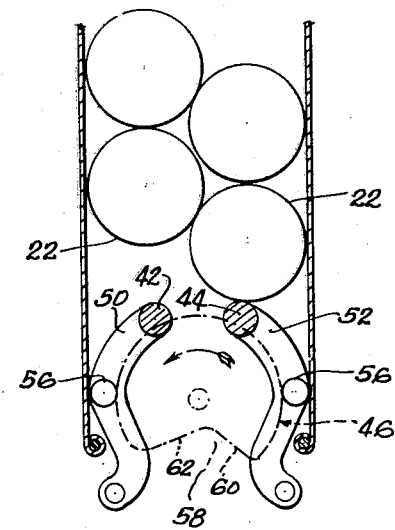
FIGURE 4 is a sectional elevational view similar to that of FIGURE 3 showing the arrangement of elements after the control cam has been rotated through an angle of about 90° from the dispensing position of FIGURE 3.

Upon continued rotational movement of the disc cam 46 to the position shown in FIGURE 4, the stud 56 on the lever arm 52 continues to ride on the periphery of the cam to retain the abutment 44 in blocking position. The other stud 56 is engaged by the trailing end 62 of the recessed portion to cam the stud outwardly for rocking the lever arm 50 from unblocking to blocking position. It will be apparent that return of the abutment 42 from unblocking position to blocking position and for receiving the load of the containers has been effected while the abutment was completely free of load, thereby to enable such return movement to be effected with minimum power requirement and without engagement of any of the containers thereby to avoid any possibilities of damage. In this position, the containers are still being blocked by the abutment 44 while the other abutment 42 of the pair is returned to blocking position.

Figure 5:
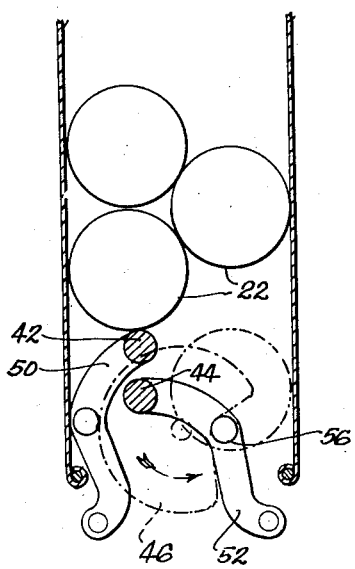
FIGURE 5 is a sectional elevational view similar to that of FIGURES 3 and 4 showing the arrangement of elements after the control cam has been rotated through an additional 90° from the position shown in FIGURE 4.

As the disc cam 46 rotates through another angle of about 90°, as shown in FIGURE 5, the stud 56 on the lever arm 52 supporting the abutment 44 in blocking position enters the recessed portion to permit the lever arm to be rocked from blocking to unblocking position, whereby the column follows the abutment downwardly until the next-to-the-lowermost container in the other row is engaged by the previously returned abutment 42. When the abutment 44 is displaced inwardly to clear the container resting thereon, the released container is free to move gravitationally downwardly from the compartment for delivery.

Figure 6:
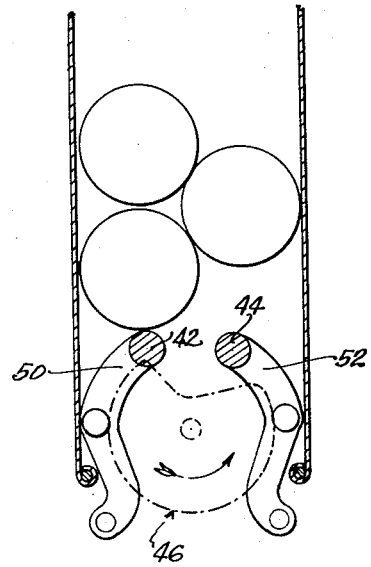
FIGURE 6 is a sectional elevational view similar to that of FIGURES 3, 4, and 5 showing the arrangement of elements after the control cam has been rotated through an additional 90° from the position shown in FIGURE 5.

As the disc cam 46 rotates a further 90° to complete its cycle, as illustrated in FIGURE 6 and in FIGURE 1, the abutment 42 is retained in blocking position while the stud 56 on the lever arm 52 is cammed outwardly to return the abutment 44 from unblocking to blocking position and in position to receive the load of the containers as the lowermost now resting upon the abutment 42 is thereafter released.

There are a number of distinct advantages in the construction and operation of a dispensing device of the type described. One which has previously been indicated resides in the lower power requirement for return of the abutments from unblocking to blocking positions since such return is effected while the abutments are substantially completely free of load and while the load of the containers is being carried substantially in its entirety by the other abutment for transmission through the lever arm and stud to the cam. Another distinct advantage is in the utilization of static load of the containers in the column to assist in the operation of the device. With the abutments 42 and 44 offset inwardly from the pivot, when in blocking position, the load of the containers will be effective to urge the lever arm to rock inwardly about the pivot. As a result, when the studs 56 enter the recessed portions, the force is transmitted from the containers to the stud riding on the leading edge of the disc cam to help drive the disc cam in rotational movement until the lowermost container is released.

A further advantage resides in the control of the movements of the containers whereby load is transferred smoothly and easily from one container to the other as the other becomes lowermost in the column, and whereby the containers are released without jarring impacts which otherwise might cause injury to the container or the contents thereof.

Still further, it will be evident that clear unidirectional movements of the elements are provided whereby the containers are free of any jamming which otherwise might cause failure in operation of the dispensing mechanism or excessive repairs thereof, or which otherwise might cause breakage of the containers, with consequent damage switch when no container lies in the path thereof.

In actual practice, the front and back walls of the compartment may be formed with separate panels 12' and 14' which are adjustable in the direction toward and away from each other to increase or decrease the effective length of the compartment more nearly to conform with the lengths of the containers to be housed therein. Each compartment is provided with a means for indicating when the compartment is empty. For this purpose, use can be made of an empty switch 64 having a switch arm 66 extending inwardly through an opening in an end wall 12 or 12' into the path to be engaged by the lowermost or next-to-the-lowermost container in the column to make the switch when a container lies in the path thereof, and to free the arm 66 and break the switch when no container lies in the path thereof.

The disc cam 46 is adapted to be rotated as by a conventional driving means, such as an electrical motor 68 mounted on the frame 20 of the dispensing machine and preferably outwardly of the compartments. The motor drive shaft is operatively connected to the cam shaft 48 for rotation thereof. When, as in the preferred practice, the disc cam 46 is mounted for rotational movement outwardly of the front and back wall of the housing, it is desirable to provide curvilinear slots 70 in the wall for passage of the studs 56 therethrough into engagment with the periphery of the cam. Under such circumstances, the ends of the slots 70 can function as stops to hold the abutments against movement beyond blocking and unblocking positions. Push button switch means 72 are adapted to initiate operation of the motor to start a vend cycle and cam switch means 74 are adapted to brake the motor to stop the vend cycle after the disc cam has been rotated through an angle of about 180° from the position shown in FIGURE 1 to the position shown in FIGURE 4, or from the position shown in FIGURE 4 to the position shown in FIGURE 6, during which the abutment supporting the column has gone through a cycle from blocking position to unblocking position and back. Various means, such as switch-operating pins on the disc cam, can be adapted for use with a stop switch to stop the operation of the motor after a vend cycle has been completed. The containers issuing from the bottom side of the compartment can be delivered by suitable chutes or carriers for access from the exterior of the vending or dispensing machine.

Having described in detail the construction and operation of a dispensing unit and the advantages thereof, description will now be made of the various ramifications which can be used embodying the concepts of this invention.

Instead of making use of a single column, as shown in FIGURES 3–6, the dispensing machine can be constructed with two columns 80 and 82 in side-by-side arrangement. As shown in FIGURE 7, each column and compartment will be of similar construction and arrangement as for the single column previously described, except that a separate dispensing unit will be provided at the base of each column. However, in a 2-column system, the disc cams 46 and 46' will be arranged with the entrance ends of the recessed portions about 90° apart so that a vend will occur first from one column and then the other upon rotation of the disc members through an angle of 90° instead of through an angle of 180°, as in the single column arrangement.

The two disc cams are interconnected for concurrent rotational movement as by means of an idler gear 84 mounted on the frame for free rotational movement with the teeth of the idler gear in meshing engagement with the teeth of the motor-driven gear 86 on the shaft of one disc member and with its teeth also in meshing engagement with the gear teeth of a driven gear 88 on the shaft of the other disc member. Thus, the one disc cam is tied into the other for concurrent rotational movement to maintain the desired angular relationship between the control cams.

In this arrangement, when the disc cams are rotated through an angle of 90° from the position of the elements as shown in FIGURE 7, the abutment to the left in the compartment to the left will be displaced by the weight of the containers from blocking to unblocking position to release the lowermost of the containers supported thereon. The other abutment of the pair and the abutment to the left in the column to the right will remain in blocking position, while the abutment to the right in the column to the right will be displaced from unblocking to blocking position while the load of the containers is supported by the other abutment in its pair.

Upon completion of the 90° of rotation, the vend cycle will be interrupted to stop the elements in the described position. Thereafter, as another vend cycle is carried out by rotating the disc cams through a further 90°, the stud on the lever arm to the left in the column to the right will be in position next to enter the recess of the disc cam 46 to enable displacement of the abutment from blocking to unblocking position to release the lowermost of the containers in the column to the right. In the meantime, both of the abutments to the right in each of the pairs will remain in blocking position to support the separate columns of containers, while the abutment to the left in the column to the left will be returned from unblocking to blocking position while it is still free of any load. Similarly, vends will be effected in alternate columns upon each rotation of the disc cams through an angle of 90°.

Instead of a 2-column arrangement, the concepts of this invention can be adapted for a 3-column arrangement, as illustrated in FIGURE 8, with each column identical in construction with the one-column arrangement previously described, except that the disc cams are arranged for concurrent movement with the recessed portions about 60° apart so that a vend will take place in response to each 60° of rotation of the disc cams, as in the manner previously described. Rotational movement is transmitted from one gear shaft to another in the group by means of interconnecting idler gears 90 and 92 whereby it is necessary to connect only one of the gear shafts with the driving motor.

The dispensing machine can be formed with four compartments 94, 96, 98, and 100 in side-by-side relation, as illustrated in FIGURE 9 of the drawings, with the train of gear-interconnected disc cams being arranged to vend in response to rotational movement through an angle of 45°. Again, the composite unit can be operated from a single motor, the gears 102 on each of the cam shafts 104 being interconnected by idler gears 106 for transmission of rotational movement from one to the others.

Similarly, 5 columns can be arranged in side-by-side relationship, with the angle between the recessed portions of the disc cams 36° apart to complete a vend cycle upon rotation of the disc cams through an angle of 36°. In a 6-column construction, the disc cams would be arranged with the recessed portions 30° apart to complete a vend cycle every 30° of rotational movement. Additional columns can be employed, the number of columns being divided into 180° to determine the angular relationship between the recessed portions of the disc cams and the angle of rotation to complete a vend cycle.

The concepts of this invention are not only adapted for use with a multiplicity of columns in side-by-side arrangement, but the concepts of the invention are applicable as well to use with columns of containers in end-to-end relation, thereby to enable more effective use to be made of depth and space in a dispensing machine.

Two, or more rows of compartments or columns in end-to-end relationship can be tied together in the machine. The angular relationship between the cam members of columns in endwise alignment should be calculated on the same basis as the angular arrangement of cams in side-by-side arrangement. Where both endwise and crosswise column arrangements are employed in the same machine, the angular relationship between the disc cams should be determined by dividing 180 by the number of cams or columns so that a vend will occur from only one column at a time.

Reference will now be made to the electrical diagram (FIG. 10) for a multi-motor dispenser embodying the features of this invention. When the necessary coin has been inserted, the coin switch A is momentarily activated, sending current to the credit solenoid B which mechanically operates credit switches C and D. Switch A then returns to its normal position. Credit solenoid B is maintained in the energized condition by a holding circuit through credit switch C if the push button switches 72 and the cam switches 74 are in their normal rest position. Lock bar solenoid switch F is simultaneously supplied with current but no function is performed because this switch is in the open condition. The coin return electro-magnet E is de-energized by credit switch C thereby to block any additional coins which might be inserted. The push button switches 72 are so interlocked that only one switch may be depressed at one time. When one of these switches is depressed, a lock bar (not shown) is activated to achieve the desired interlock. When one of the selector push button switches 72 is depressed, current is supplied through line L1 to the cam switches 74 and through the normally closed contacts of sold-out switches 64 to the credit switch D and through the lock bar switch G (which is closed by operation of a push button 72 through a connection to the lock bar) to energize lock bar solenoid H. The latter locks the lock bar in position to hold the depressed push button switch 72 in the depressed condition. Lock bar solenoid H also mechanically activates the lock bar solenoid switch F, supplying current to the depressed push button switch 72 if the coin switch A is in its normal rest position. Current is transmitted to the dispenser motor 68 for initiating operation thereof. The motor operates its own cam switch 74 to maintain the circuit to the motor by supplying current through the other cam switches which are in their normal rest position. When the cam switch 74 is operated, circuit to the push button switches 72 is cut and this in turn cuts the circuit to the credit solenoid B and to the lock bar solenoid H thereby to return the entire system to rest condition with the exception of the dispenser motor 68, the operated cam switch 74 and the coin return electromagnet E. The dispenser motor 68 continues to run through its complete cycle at which time the cam switch 74 is deactivated. This results in cutting off the current to the dispenser motor 68 and energizing the coin return electro-magnet E to complete the entire cycle of operation.

It will be apparent from the foregoing description that I have provided a simple and efficient means for dispensing articles in column arrangement. It will be further apparent that a device of the type described can be adapted for use with a multiplicity of columns each of which may be provided with bottled beverages of different flavors or of various other articles to be dispensed, thereby to provide a flexibility in construction and operation which facilitates automatic dispensing from a machine which is characterized by minimum requirements of power for operation and minimum interferences of elements, thereby to reduce the cost of operation and repairs.

It will be understood that numerous changes may be made in the details of construction, arrangement and operation without departing from the spirit of the invention, especially as defined in the following claims.

I claim:

1. In an article dispensing machine, a dispensing unit comprising a compartment open at the bottom and having side, front and back walls wherein the front and back walls are spaced one from the other lengthwise of the compartment by an amount greater than the length of the articles to be dispensed and the side walls are spaced crosswise of the compartment by an amount greater than the width of one but less than twice the width of the articles to be dispensed, a pair of abutments, means for mounting said abutments for movement between a blocking position in which the abutments are spaced one from the other and from the side walls of the compartment by an amount less than the width of the articles to be dispensed and an unblocking position in which the abutments are spaced from the originally adjacent side walls of the compartment by an amount greater than the width of an article to be dispensed to enable an article to pass downwardly therebetween, and single means for controlling movement of the abutments alternately to displace one of the abutments of the pair from blocking to unblocking position and back to its initial position while the other remains in blocking position, said means for controlling movement of the abutments between blocking and unblocking positions including a disc cam mounted for rotational movement about an axis midway between the side walls of the compartment and having a recessed portion extending through an angle of less than 180° of the disc cam, a pivotal member affixed to each of said abutments and having a portion adapted to engage the periphery of said cam, and means for rotating the disc cam whereby the abutments are maintained in blocking position when said portion is in operative engagement with the periphery of the disc cam and whereby the abutments can be displaced to unblocking position when said portion is in operative engagement with the recessed portion of the disc cam.

2. In an article dispensing machine, a dispensing unit comprising an elongated vertically disposed article containing compartment which is open at the bottom and which is defined by end walls and by side walls spaced one from the other by an amount greater than the width of one but less than twice the width of the articles to be dispensed, a pair of abutments, means mounting said abutments for individual movement between a blocking position with respect to certain articles in said compartment in which the abutments are spaced one from the other and from the side walls of the compartment by an amount less than the width of an article to be dispensed and an unblocking position with respect to certain articles in said compartment in which the abutments are spaced from the originally adjacent side wall of the compartment by an amount greater than the width of an article to be dispensed, said means including a lever arm pivoted for rocking movement about a pivot spaced downwardly and outwardly towards the side walls of the compartment with reference to the abutment when in blocking position whereby the abutments rock inwardly and downwardly in a direction away from the adjacent side walls when displaced from blocking to unblocking position, a disc cam mounted for rotational movement about an axis parallel with the side walls of the compartment and substantially midway therebetween and wherein the disc cam is mounted about midway between the pivots and has a recess extending inwardly from the periphery thereof through an angle of less than 180°, and means on each lever arm intermediate the pivot and the abutment in operative engagement with the periphery of the disc cam, and means for rotating the disc cam whereby the means in operative engagement with the periphery thereof operates to maintain the abutments in blocking position during operative engagement with the periphery of the disc cam and enables said abutments to be displaced from blocking position to unblocking position and back in response to operative engagement with the recessed portion of the disc cam.

3. An article dispensing machine as claimed in claim 2 in which the means on the lever arm in operative engagement with the disc cam comprises a follower rigid with the lever arm and urged into contact to follow the periphery of the disc cam.

4. An article dispensing machine as claimed in claim 2 which includes means for adjusting the spaced relationship between the side walls of the compartment.

5. An article dispensing machine as claimed in claim 2 in which the articles to be dispensed comprise cylindrical articles having a body portion of large diameter and a neck portion of small diameter and which includes guide means on an end wall of the compartment for receiving the neck end portion of the article for guiding said article during movement downwardly through the compartment.

6. An article dispensing machine as claimed in claim 2 in which the articles to be dispensed comprise cylindrical members mounted in staggered relationship within the compartment with the vertical center lines of the staggered articles being spaced one from the other and the side walls of the compartment by an amount less than the diameter of the articles.

7. In an article dispensing device having means defining a compartment provided with laterally spaced side walls and end walls for holding two generally vertical rows of articles in side-by-side relation with the articles in each of said rows laterally and alternately overlapping the articles in the other row, the improvement comprising: a pair of movable abutments in said compartment at the same elevation therein and arranged with one abutment below each of said rows for supporting said articles; each of said abutments being pivotally mounted for lateral swinging movement about a pivotal axis, parallel to said side walls, spaced downwardly therefrom and laterally outwardly thereof whereby the weight of articles thereon urges said abutment to swing inwardly; and a cyclically rotatable cam arranged to control swinging movements of said abutments about their respective pivotal axes so that one abutment is permitted to swing inwardly sufficiently far to release the bottom article from its associated row to pass between said abutment and the adjacent side wall while the other abutment is held in supporting position beneath its associated row, and cyclically thereafter to permit said other abutment to swing inwardly to article releasing position while holding said one abutment in supporting position beneath its associated row.

8. A device as defined in claim 7 wherein said cam comprises a disc cam mounted for rotation about an axis substantially parallel to the pivotal axes of said abutments; each of said abutments having a cam follower element fixed thereto and engaging the periphery of said disc cam.

9. A device as defined in claim 8 wherein each of said abutments includes an elongated stop member extending generally parallel to said side walls and an arm extending downwardly from one end thereof to its pivotal axis; said cam follower being mounted on said arm between said stop member and said pivotal axis; said cam comprising a circular disc having a notch in its periphery and positioned between said cam followers so that they engage diametrically opposed portions of said cam.

10. A device as defined in claim 9 wherein said arms are pivotally mounted against the inner face of one of said end walls and wherein said disc cam is journalled against the outer face of said end wall; openings through said end wall adjacent the periphery of said cam, said cam followers extending through said openings.

References Cited in the file of this patent

UNITED STATES PATENTS

| | | |
|---|---|---|
| 1,944,499 | Crimp | Jan. 23, 1934 |
| 2,615,773 | Holt et al. | Oct. 28, 1952 |
| 2,762,524 | Johnson | Sept. 11, 1956 |
| 2,835,409 | Rankin | May 20, 1958 |
| 2,836,326 | Childers | May 27, 1958 |
| 2,877,924 | Childers et al. | Mar. 17, 1959 |
| 2,878,961 | Voorhees et al. | Mar. 24, 1959 |
| 2,890,813 | Childers et al. | June 16, 1959 |
| 2,988,246 | Johnson et al. | June 13, 1961 |